United States Patent [19]
Atkins

[11] Patent Number: 5,921,341
[45] Date of Patent: Jul. 13, 1999

[54] VEHICLE

[75] Inventor: David S. Atkins, Broederstroom, South Africa

[73] Assignee: Terrapid Technologies CC, Broederstroom, South Africa

[21] Appl. No.: 08/731,262

[22] Filed: Oct. 11, 1996

[30] Foreign Application Priority Data

Oct. 11, 1995 [ZA] South Africa ............................. 95/8561

[51] Int. Cl.⁶ ............................. B60G 9/02; B60G 11/23; B60K 17/32; B62D 63/02
[52] U.S. Cl. ......................... 180/350; 180/217; 180/908; 280/124.169; 280/124.13; 280/43.2; 267/257; 267/281; 188/18 A; 188/72.9
[58] Field of Search ..................... 280/717, 716, 280/723, 721, 700, 43.18, 43.2; 180/217, 215, 210, 350, 349, 357, 908; 267/257, 281, 279, 278; 188/2 D, 18 A, 72.9

[56] References Cited

U.S. PATENT DOCUMENTS

| 662,207 | 11/1900 | Thornycroft | 180/350 |
|---|---|---|---|
| 1,753,489 | 4/1930 | Weinhardt | 267/279 |
| 2,264,023 | 11/1941 | Faber | 280/721 |
| 2,393,183 | 1/1946 | Parker | 280/717 |
| 2,596,904 | 5/1952 | Krotz | 267/278 |
| 2,715,022 | 8/1955 | Krotz | 267/281 |
| 3,062,329 | 11/1962 | Erickson | 188/72.9 |
| 3,087,716 | 4/1963 | Nilsson | 267/257 |
| 3,512,599 | 5/1970 | Hott et al. | 180/217 |
| 3,545,737 | 12/1970 | Lamprey et al. | 267/279 |
| 4,074,910 | 2/1978 | Hoffman et al. | 188/18 A |
| 4,287,960 | 9/1981 | McConnell | 180/217 |
| 4,328,877 | 5/1982 | Ballard . | |
| 4,574,902 | 3/1986 | Irimajiri | 180/350 |
| 4,589,677 | 5/1986 | Matschinsky | 280/716 |
| 4,629,023 | 12/1986 | Carpanelli et al. | 180/357 |

FOREIGN PATENT DOCUMENTS

| 2-109727 | 4/1990 | Japan | 180/908 |
|---|---|---|---|
| 434342 | 8/1935 | United Kingdom . | |
| 759971 | 10/1956 | United Kingdom . | |
| 833356 | 4/1960 | United Kingdom . | |
| 1498168 | 1/1978 | United Kingdom . | |
| 2064447 | 6/1981 | United Kingdom . | |
| 1600589 | 10/1981 | United Kingdom . | |
| 82/01518 | 5/1982 | WIPO | 280/721 |

*Primary Examiner*—Peter C. English
*Attorney, Agent, or Firm*—Darby & Darby

[57] ABSTRACT

A suspension unit for each rear wheel of a motor powered off-road four wheeled vehicle comprising a suspension arrangement with the inner members constructed for mounting on a fixed shaft secured to the vehicle and the outer casing carrying a swing arm terminating in a swivel joint to be secured to a single rear wheel axle and a pair of such a units in combination with a drive chain and sprocket device for the single axle and a braking system having at least one disc brake for fixed mounting on the rear axle with caliper carried on an operating arm supported from a bearing to be mounted on the same axle.

14 Claims, 5 Drawing Sheets

VEHICLE

INTRODUCTION

This invention relates to a vehicle and more particularly to small motor driven vehicles such as those known as go-karts and golfers caddy carts for example.

BACKGROUND OF THE INVENTION

Small vehicles of the kind referred to are becoming more and more popular for recreational and other general purpose off-road usage. In general the vehicles lack adequate suspension units to enable them to be used at speed unless they are driven on flat and smooth prepared tracks. This is a severe limitation and removes much of the pleasure to which they could otherwise be put.

Also where they are to be driven at high speed braking cannot easily be effected using simple Bowden cable mechanisms because of the lack of effective movement of the braking mechanism components that can be applied with adequate force.

OBJECT OF THE INVENTION

It is the object of the present invention to provide a vehicle which will overcome the above disadvantages to a large degree.

SUMMARY OF THE INVENTION

According to this invention there is provided a motor powered off road four wheeled vehicle having a rear suspension comprising a suspension arrangement for each rear wheel both mounted on a fixed shaft with the outer casing carrying a trailing arm connected to a wheel axle.

Further features of this invention provide for the shafts for the suspension assemblies to be a single shaft for a rear mounted motor drive, for the inner member of each suspension arrangement to be secured to a transverse bracket connected to an adjustable stay to enable the vehicle chassis height relative to the ground to be adjusted and for the trailing arms to be connected to wheel axles through spherical bearings.

Still further features of this invention provide for the resilient blocks of the suspension arrangements to be moulded from polyurethane and for the blocks to be moulded between the outer casing and inner members angularly offset from their normal forty five degree relationship to provide minimal distortion before the material becomes compressed, thereby reducing tension on the polyurethane blocks and for the amount of offset to be between five and ten degrees.

The invention also provides for the drive from the motor to the wheel axles to be a reduction chain drive through a shaft and a centrifugal clutch.

Further features of this aspect of the invention are for the shaft to be provided by the shaft carrying the suspension assemblies for the vehicle, for there to be a single driven axle for both wheels, for at least one of the chain sprockets to be interchangeable with another having a different number of teeth and for the sprocket on the wheel axle to be located between plates positioned to hold the chain on the sprocket.

Another aspect of this invention provides for the braking system to be a disc brake or brakes with the disc secured to the wheel axle and the calliper to be supported from a bush mounted on the wheel axle.

Further features of this aspect of the invention provide for the calliper to be angularly located on the wheel axle by a stay between it and the swing arm, for the stay to provide limited movement between it and the component to which it is attached and for the calliper to be operated by a Bowden cable.

Still further features of this aspect of the invention provide for the calliper operating arm to carry a pulley at the end remote from its pivot and over which the cable of the Bowden cable is threaded to its anchor on the fixed calliper arm, for the operating arm to carry a pressure applying pintle between its pivot and the pulley and for the pivot point to be adjustable relative to the fixed arm of the calliper.

The adjustment may be effected through a spring loaded screw passing through the calliper support to act to move the operating arm pivot point.

The chassis also provides a removable driver's seat mounted for longitudinal adjustment on the chassis and for the motor and brake control to be through Bowden cables operated through pedals pivotally mounted to the chassis.

BRIEF DESCRIPTION OF THE DRAWINGS

The above features and many other will become apparent from the following description of one example of the invention. In this description reference will be made to the accompanying drawings in which.

DETAILED DESCRIPTION OF THE THE DRAWINGS

Figure 1:
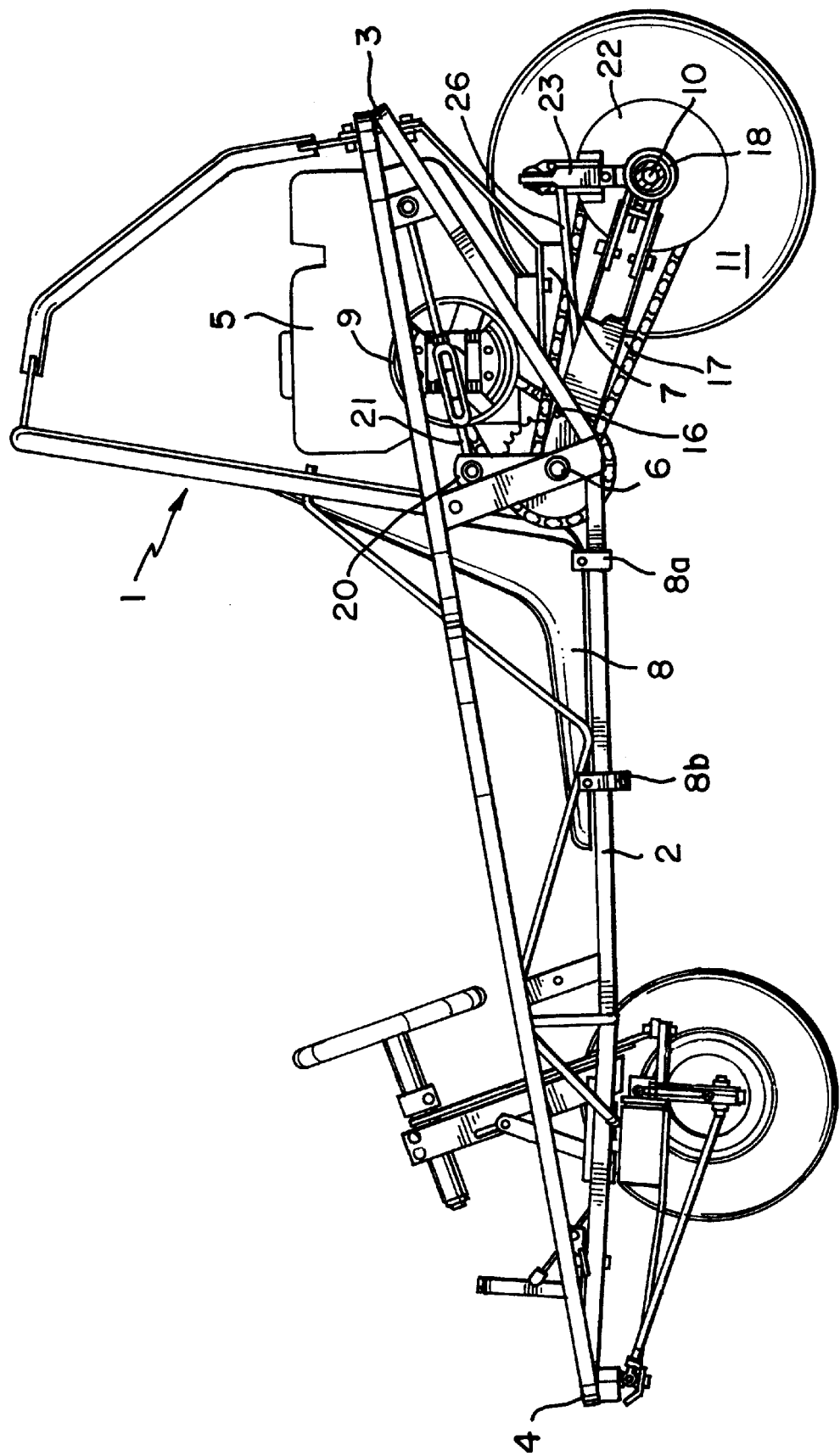
FIG. 1 is a side elevation of the veicle.
Figure 2:
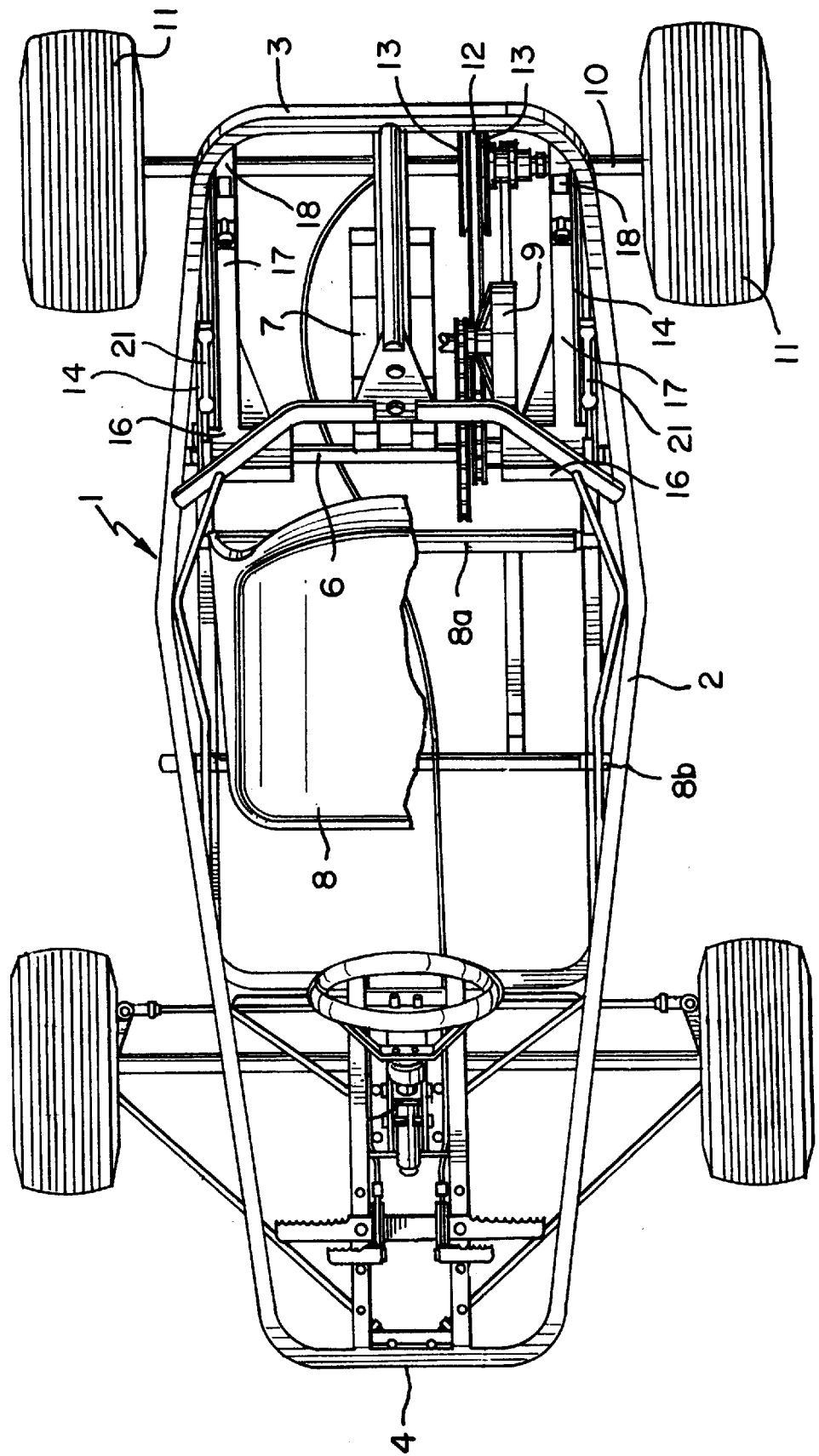
FIG. 2 is a top plan view of the vehicle.
Figure 3:
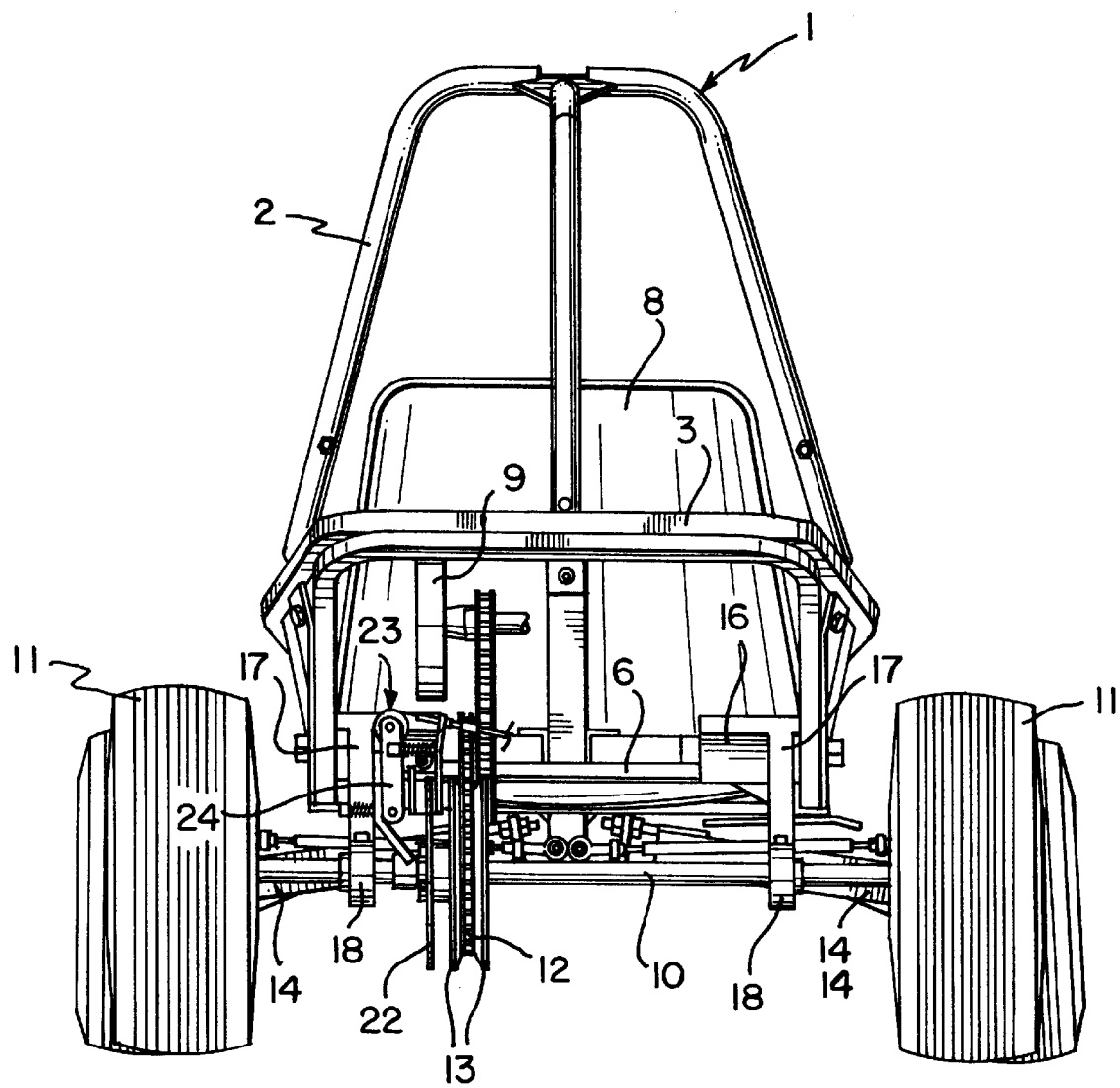
FIG. 3 is a rear end view of the vehicle showing the rear suspension and drive assembly.

As illustrated the invention is applied to a vehicle which is an off-road go-kart.

The vehicle indicated generally at (1) in the accompanying drawings has a chassis (2) fabricated from suitable bent and welded hollow steel tubing. The chassis (2) has a generally upwardly inclined rear end (3) and inwardly tapered front end (4).

A conventional motor (5) in the form of internal combustion engine is mounted in a cradle formed by a shaft (6) and a bracket (7) so that the motor is bolted in position in the chassis (2) by a single bolt at the rear of the chassis through the bracket (7) and bolts onto the shaft (6).

A driver's seat (8) is mounted to the chassis (2) forward of the motor (5) and this seat is adjustable along the length of the chassis (2). The seat is supported on rollers (8a) carried by clamps (8b) securable to the chassis by means of a spring-loaded indent pin in well known manner.

The drive from the motor (5) is a chain and sprocket drive coupled to the motor through a centrifugal clutch (9). Reduction of the output shaft speed is obtained by appropriate choice of sprockets on the output shaft, shaft (6) and single rear axle (10) for rear wheels (11) of the vehicle. The sprocket (12) on the axle (10) is positioned between wear resistant plates (13).

These plates (13) retain the chain between the shaft (6) and axle (10) on the sprocket when relative movement between axle (10) and shaft (6) takes place due to the independent suspension provided for each rear wheel (11) as is more fully described below.

It will be understood that at least the sprocket on the motor output shaft will be interchangeable with another having a different number of teeth so that the drive ratio can be varied. The other sprockets can also be interchangeable and in particular where a minor change in ratio is desirable this can be achieved by changing the sprocket carried by the axle (10).

Figure 4:
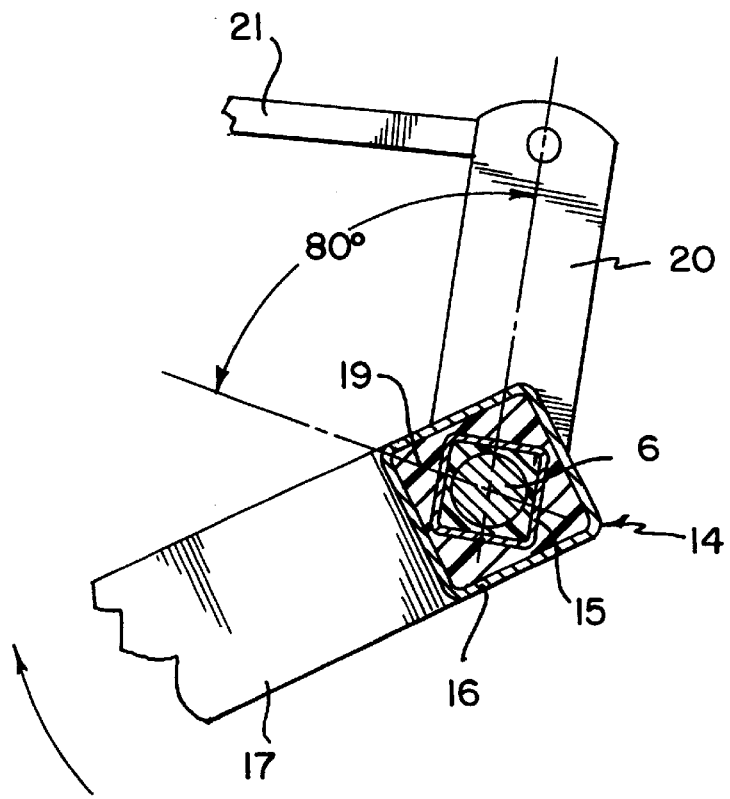
FIG. 4 is an enlarged partial sectional view of a suspension unit in accordance with the invention.

Each rear wheel (11) is carried by an independent suspension unit (14). As shown in FIG. 4 the shaft (6) has the inner member (15) of a suspension unit secured thereto adjacent each end of the shaft (6). The outer member (16) of each unit has a trailing swing arm (17) rigidly secured thereto and the free end of the swing arm (17) is attached to the axle (10) by means of a spherical bearing (18). Other swivel couplings for the attachment of the swing arm to the axle can be used.

This arrangement has been found to give a satisfactory independent suspension for each rear wheel (11).

The arrangements (14) are modified in that the resilient blocks (19) indicated in FIG. 4 are provided by moulding in situ polyurethane of appropriate hardness.

Also as shown in FIG. 4 is a feature of this invention and that is that the blocks are moulded in position with the inner (15) and outer (16) members of the arrangement (14) offset from their normal 45° angular inclination to each other. This offset is between 3° and 10° usually about 5° and ensures that the blocks (19) are set up for compression loading immediately the arrangement (14) is placed under working stress. This avoids the tendency for the blocks to tear at least partially from the inner and outer members of the arrangements (14). For clarity FIG. 4 shows an angle of 10°.

The use of polyurethane in place of rubber normally used in suspension arrangements has also been found to reduce heat build up in the units during use of the vehicle.

It will be appreciated that the suspension of the axle (10) described above will result in the ends of the axle moving both forwardly and rearwardly and upwardly and downwardly with respect to each other and this will tend to pull the chain between the shaft (6) and axle (10) off the sprocket secured to the axle (10). This tendency is compensated for to a practical degree by the plates (13).

Each inner member (15) of the arrangements (14) carries a transverse bracket (20) connected to the chassis (2) by an adjustable stay (21). The stay (21) can be in the form of a turn buckle. This enables the inner and outer members to be moved angularly with respect to each other and thus lower or raise the chassis (2) relative to the wheels (11). The suspension can thus be adjusted to compensate for drivers of different weights.

Figure 5:
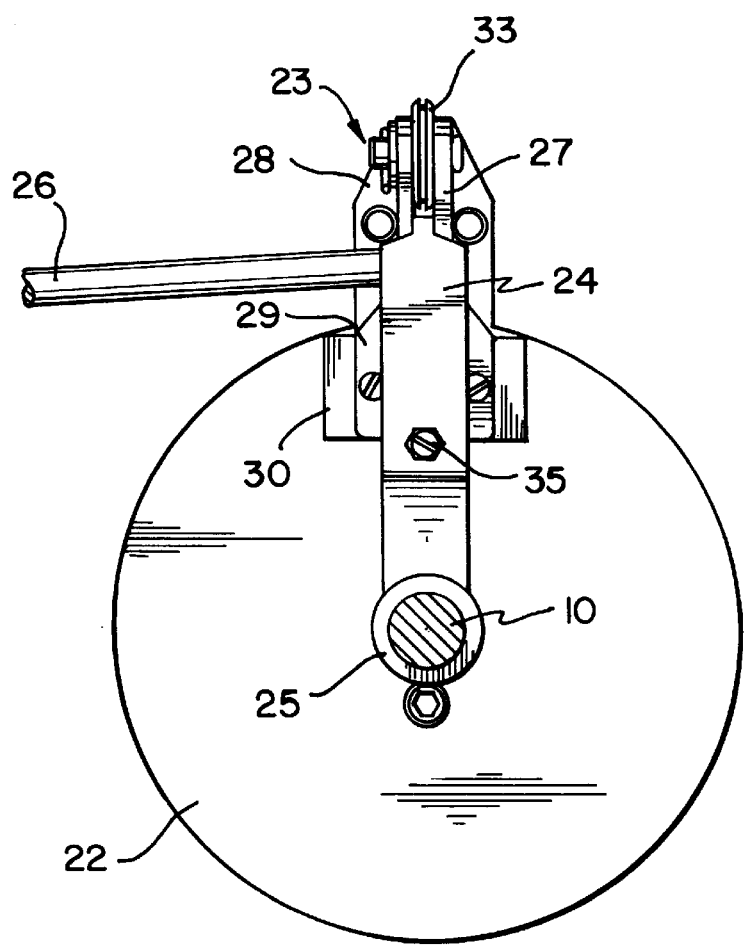
FIG. 5 is plan view of the brake assembly.
Figure 6:
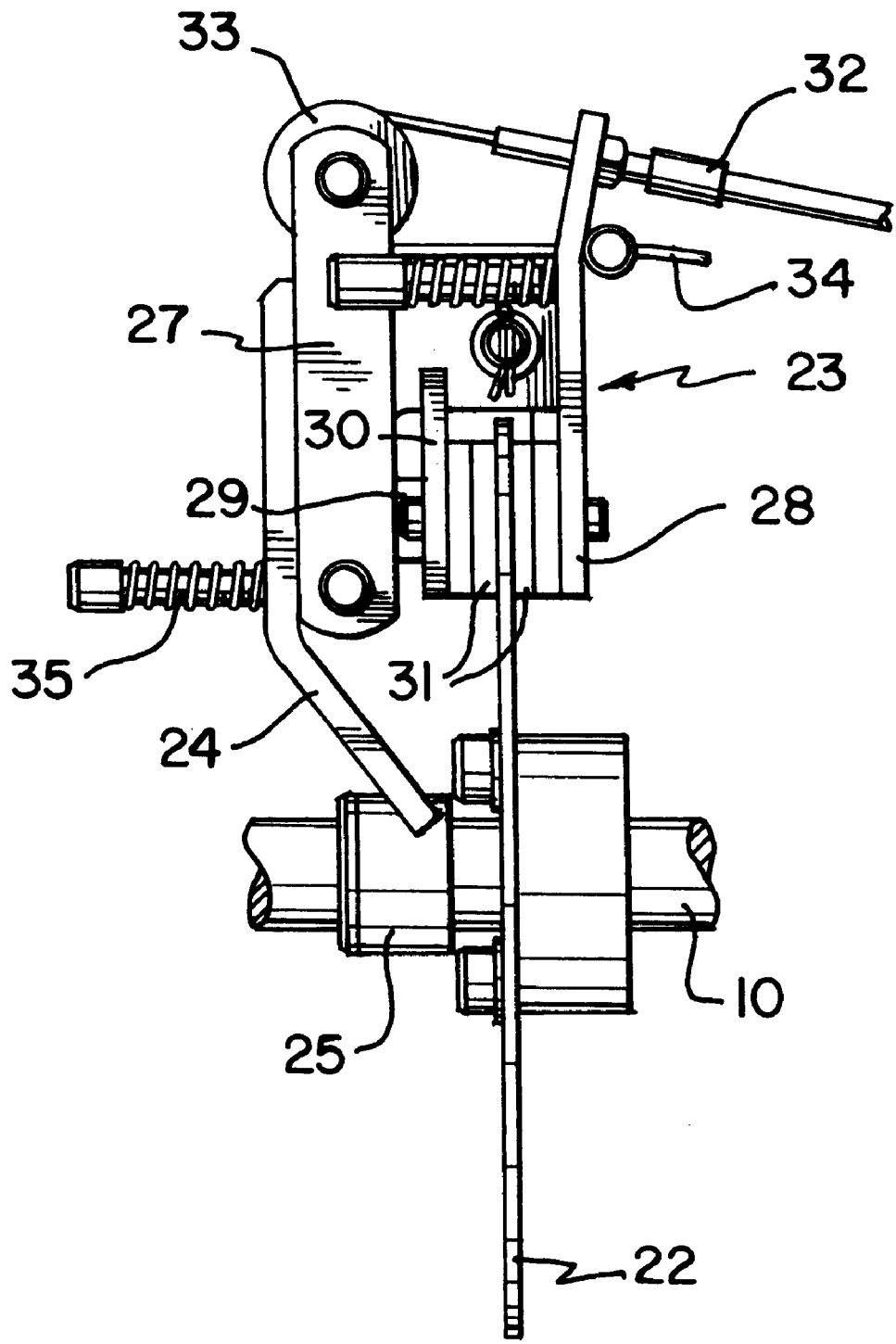
FIG. 6 is a side elevational view of the brake assembly.

The braking system for the vehicle is a disc brake assembly illustrated in FIGS. 5 and 6.

The disc (22) is rigidly mounted on the axle (10) and the calliper arrangement (23) is carried on an arm (24) extending from a bush (25) which is mounted on the axle (10) so that the latter may rotate freely in the bush (25). To hold the calliper in the correct radial position relative to the axle, usually vertical, a stay (26) extends from the arm (24) to the swing arm (17). To allow for the movement of the axle (10) the connections between the stay (26) and swing arm (17) and arm (24) will allow a limited degree of movement between these components.

A movable calliper component (27) and a fixed calliper component (28) are supported from the arm (24). The movable calliper component (27) is pivotally mounted with respect to arm (24) to enable a pintle (29) carried by calliper component (27) to move in guide plate (30), to cause relative movement of brake pads (31) disposed on opposite sides of the disc (22). The end of the pintle (29) is rounded to accommodate travel in an arcuate path against the brake pads (31).

Movement of the calloiper component (27) is effected through a Bowden cable indicated at (32). To make the movement of the cable (32) more effective the calliper component (27) carries a pulley (33) at its upper end. The cable (32) is connected through the component (28) where the cable sheath can be anchored and passes over and around the pulley (33) to have its end (34) anchored to the component (28).

The inclusion of the pulley (33) in the cable system has been found to be of considerable assistance in allowing a smooth braking pressure to be applied through the calliper to the disc (22).

The pivot of component (27) is made to be adjustable laterally to take up wear of the brake pads when necessary. A spring loaded screw (35) is threaded through the arm (24) to contact the pivot and locate its position relative to the arm (24).

It will be appreciated that the calliper unit will orientate itself relative to the disc (22) because the bush (25) can move axially on the axle (10).

The construction described above enables components of the vehicle to be of substantially modular construction which facilitates both assembly and repair. The vehicle is also robust and the various features enable it to be economically manufactured while providing a unique construction for vehicles of this kind.

It will be appreciated that many variations and modifications to the details of construction set out above can be made without departing from the scope of this invention. Protection roll bars may be included and the design shape of the chassis varied to suit requirements. Also the vehicle may be modified from the go-kart described to be suitable as a golfers caddy cart or some other low speed vehicle to be used over uneven terrain.

What I claim as new and desire to secure by Letters Patent is:

1. A rear suspension unit for a rear wheel of a motor powered off-road four wheeled vehicle having a chassis, said rear suspension unit comprising:

an inner member with a first cross-sectional shape having at least one angular portion, an outer member with a second cross-sectional shape having at least one angular portion, said inner member positioned within said outer member such that said at least one angular portion of said first cross-sectional shape is angularly offset from said at least one angular portion of said second cross section shape by an inclination in a range of 35° to 42°;

resilient blocks disposed between said inner member and fan said outer member, with said inner member constructed for mounting on a shaft fixed to the vehicle chassis, and said outer member carrying a trailing arm terminating in a swivel joint constructed to be secured to a single rear axle for the vehicle.

2. A rear suspension unit as claimed in claim 1, in which said swivel joint is a spherical bearing.

3. A rear suspension unit as claimed in claim 1, in which said resilient blocks are moulded from polyurethane.

4. A rear suspension unit as claimed in claim 1, in which said inner member has a transverse bracket fixed thereto with an adjustable stay connected to said bracket arranged to be secured to the vehicle chassis remote from said shaft, providing for adjustment of the chassis height above the ground.

5. A rear suspension for a first and a second rear wheel of a motor powered off-road four wheeled vehicle comprising a rear suspension unit as claimed in claim 4 for each of the first and the second rear wheel of said vehicle, each rear suspension unit having an inner member fixed to said shaft.

6. A motor powered off-road four wheeled vehicle having a rear suspension including separate rear wheel suspension units, each rear wheel suspension unit including resilient blocks disposed between an inner member and an outer member with each said inner member constructed for mounting on a shaft fixed to a chassis of the vehicle and each said outer member carrying a trailing arm terminating in a swivel joint constructed to be secured to a single rear axle for the vehicle, said vehicle further having a rear mounted motor connected to drive the rear wheels through at least one sprocket disposed on said shaft such that the at least one sprocket and said shaft share a common axis.

7. A motor-powered off-road four wheeled vehicle with a rear suspension including a pair of rear suspension units, each rear suspension unit including resilient blocks disposed between an inner member and an outer member with each said inner member mounted on a shaft fixed to a chassis of the vehicle and each said outer member carrying a trailing arm terminating in a swivel joint secured to a single rear axle for the vehicle, said vehicle including a drive assembly in the form of a rear mounted motor connected to a reduction chain and sprocket drive through at least one sprocket disposed on said shaft and a centrifugal clutch to the single axle.

8. An off-road vehicle as claimed in claim 7, in which said sprocket drive includes a sprocket secured to said axle between plates positioned to retain said reduction chain on said sprocket.

9. An off-road vehicle as claimed in claim 7, in which said sprocket drive includes a plurality of sprockets and at least one of said sprockets is interchangeable with another sprocket having a different number of teeth.

10. A motor-powered off-road four wheeled vehicle with a rear suspension including a pair of rear suspension units, each rear suspension Unit including resilient blocks disposed between an inner member and an outer member with each said inner member mounted on a shaft fixed to a chassis of the vehicle and each said outer member carrying a trailing arm terminating in a swivel joint secured to a single rear axle for the vehicle, said vehicle including a braking system having at least one disc brake fixedly mounted on said rear axle and having a calliper carried on an operating arm supported from a bearing mounted on said rear axle.

11. A motor-powered off-road four wheeled vehicle with a rear suspension including a pair of rear suspension units, each rear suspension knit including resilient blocks disposed between an inner member and with outer member with each said inner member mounted on a shaft fixed to a chassis of the vehicle and each said outer member carrying a trailing arm terminating in a swivel joint secured to a single rear axle for the vehicle, said vehicle including a braking system having at least one disc brake fixedly mounted on said rear axle and having a calliper carried on an operating arm supported from d bearing mounted on said rear axle, in which a stay extends from one said trailing arm to said operating arm in a manner providing limited movement between said slay and said trailing arm and said operating arm.

12. A motor-powered off-road four wheeled vehicle with a rear suspension including a pair of rear suspension units, each rear suspension unit including resilient blocks disposed between an inner member and an outer member with each said inner member mounted on a shaft fixed to a chassis of the vehicle and each said outer member carrying a trailing arm terminating in a swivel joint secured to a single rear axle for the vehicle, said vehicle including a braking system having at least one disc brake fixedly mounted on said rear axle and having a calliper carried on an operating arm supported from a bearing mounted on said rear axle, in which the braking system calliper includes a movable calliper component having a first end and a second end, said first end being pivotally mounted to said operating arm, and a fixed calliper component, wherein said movable calliper component is operated by a Bowden cable, said movable calliper component supporting a pulley at its second end over which said Bowden cable is threaded for attachment to an anchor on said fixed calliper component.

13. An off-road vehicle as claimed in claim 12, in which said movable calliper component has a pivot point with respect to said operating arm which is adjustable relative to said operating arm of the calliper.

14. An off-road vehicle as claimed in claim 13, in which adjustability for the calliper is provided by a spring loaded screw passing through said operating arm to act on said pivot point of said movable calliper component.

\* \* \* \* \*